United States Patent [19]
Belshaw

[11] Patent Number: 5,227,186
[45] Date of Patent: Jul. 13, 1993

[54] APPARATUS AND METHOD FOR FORMING LIGHTWEIGHT EDIBLE PRODUCTS

[75] Inventor: Thomas E. Belshaw, Seattle, Wash.

[73] Assignee: Belshaw Bros., Inc., Seattle, Wash.

[21] Appl. No.: 938,993

[22] Filed: Sep. 2, 1992

[51] Int. Cl.$^5$ .................... A21C 11/00; A23P 1/00
[52] U.S. Cl. ........................... 426/439; 99/354;
425/133.1; 425/287; 425/288; 426/514;
426/516
[58] Field of Search ............. 426/439, 514, 516;
99/354, 407; 425/132, 133.1, 287, 288

[56] References Cited

U.S. PATENT DOCUMENTS

| | | | |
|---|---|---|---|
| 3,504,619 | 4/1970 | Fester et al. | 99/354 |
| 4,346,649 | 8/1982 | Wilke et al. | 99/337 |
| 5,100,685 | 3/1992 | Belshaw et al. | 426/439 |

FOREIGN PATENT DOCUMENTS

0273760 7/1988 European Pat. Off. ............. 99/354

*Primary Examiner*—George Yeung
*Attorney, Agent, or Firm*—Seed and Berry

[57] ABSTRACT

A doughnut making machine and apparatus has a hopper for the dough of a type which exudes gluten or other sticky substances when compressed, the hopper terminates in a lower cylinder which co-acts with the cutting surfaces on a lower cutting piston. An extruding piston pushes the dough out between the cutting edge of the cylinder and the cutting piston and, thereafter, with retraction of the cutting piston, the dough is severed into a conventional toroidal shape and falls in cooking oil in a frying tank. Cooking oil from the frying tank is distributed onto the cutting edges of the piston and the cutting edge of the cylinder by various distribution techniques. Cooking oil is picked up from the frying tank using a dipstick and is transmitted to the dough cutting surfaces using gravity and capillary action. The method by which doughnuts are extruded in a generally toroidal shape while distributing a film of cooking oil onto the dough cutting surfaces and then severing the formed toroidal shaped doughnut from the cutting surfaces whereby the doughnut contacts the cooling oil on the dough cutting surface and freely releases from the cylinder's cutting edge.

15 Claims, 6 Drawing Sheets

APPARATUS AND METHOD FOR FORMING LIGHTWEIGHT EDIBLE PRODUCTS

TECHNICAL FIELD

This invention pertains to edible product frying machines, and particularly to doughnut frying machines of the type in which a doughnut or other edible product is formed and dropped into a frying tank.

BACKGROUND OF THE INVENTION

Doughnut frying machines are known. Typical examples are shown in U.S. Pat. Nos. 3,945,785 and 4,346,649. In these types of doughnut frying machines or fryers, the dough is stored in a hopper and extruded out through a cylinder or cylinders forming a cutter in the bottom of the hopper by reciprocating piston mechanisms. An upper piston pushes the dough into and out of the cylinder, whereas a lower piston on operation creates a partial vacuum to allow the air pressure to move the dough into the cylinder. The lower piston also can be retracted to serve as a cutter to cut the extruded dough from the dough remaining in the cylinder by engaging the lower piston against the bottom cutting edge of the cylinder. The doughnut that forms is the typical toroidal shape and falls by gravity into a frying tank, between the flights of a moving conveyor, or into an open kettle.

As long as the doughnuts or other edible products are reasonably large in size, the weight of the product is sufficient to produce a clean and quick separation from the cutting edge of the hopper cylinder. During the extrusion of the dough, particularly non-yeast dough as is used in making doughnuts, components of the dough, such as gluten or other sticky substances, will build up and form a film on the cutting edge of the cylinder and the cutting piston. With heavier doughnuts, the weight of the doughnut is sufficient to still provide a reasonably clean and quick separation from the cutting edge of the cylinder. With lighter weight doughnuts, such as mini-doughnuts, which are frequently formed in multiple cylinders in a single hopper, the gluten attached to the cutting surfaces adheres to the extruded formed doughnut dough, leaving strings of dough attached to the cutting surfaces when the doughnut finally falls free. More importantly, however, the adhesion of the dough to the gluten-coated cutting surfaces occasionally causes the doughnut to adhere and fall only after a nonuniform time delay such that, when the doughnut does fall, it will not fall between the flights on the conveyor but may land on a conveyor flight, damaging the product and causing the need for more frequent cleaning of the equipment. Also, if the doughnut sticks at one end it can topple onto its edge while falling into the cooking oil and be distorted in shape.

An apparatus and a method for preventing lightweight doughnuts from adhering to the cutting surfaces of a doughnut frying machine is disclosed in U.S. Pat. No. 5,100,685 the '685 patent), which is incorporated herein by reference. The apparatus and method disclosed in the '685 patent prevents sticky, glutinous substances from building up on the cutting surfaces by providing edible oil to the cutting surfaces. As a result, the lightweight doughnuts do not adhere to the cutting surfaces.

The apparatus and method disclosed in the '685 patent works well to prevent glutinous substance build-up and consequent doughnut adhesion. The '685 patent covers any form of edible release oil. One form of release oil is the oil used to fry the doughnuts.

SUMMARY OF THE INVENTION

It is an object of the invention to provide an improved dough products forming mechanism for making dough products that fall from the cutting cylinder into a frying tank.

It is another object of the invention to provide a method and apparatus for distributing cooking oil onto the cutting surfaces of a doughnut extruding mechanism to inhibit the buildup of sticky substances and so give a clean and quick release of the product.

The apparatus invention includes at least one doughnut extruding cylinder having a lower open end terminating in a cutting edge, reciprocating a lower cutting piston and the cylinder relative to one another, reciprocating an upper extruding piston and the cylinder relative to one another, forming the edible dough product by extruding a small amount of the dough between the upper and lower pistons out of the open end of the cylinder and then retracting the lower piston and cylinder relative to one another to cut the shaped product from the dough remaining in the cylinder, and providing cooking oil to the surfaces of the cutting edge of the lower open end of the cylinder, the inside surface of the cylinder, and the lower cutting piston to inhibit the buildup of gluten or other sticky substances on these surfaces and assuring a clean release and free-fall of the formed product by gravity into the frying tank. Either the pistons can move in the cylinders or the cylinder can move relative to the pistons.

Various embodiments are provided for the distribution of the cooking oil to the cutting surfaces. In a first embodiment, a threaded dipstick is connected to a lower side of the lower piston. The dipstick picks up cooking oil from the frying tank when the lower piston is lowered. The cooking oil travels by capillary action up the dipstick, across the lower side of the lower piston, to the cylinder and piston cutting surfaces.

In a second embodiment, a dipstick reciprocates in and out of the lower piston. The dipstick picks up cooking oil from the frying tank and wipes the oil on the lower side of the lower piston as the dipstick moves into the lower piston. The cooking oil travels by capillary action and gravity across the lower side of the lower piston to the cylinder and piston cutting surfaces.

The method of the invention includes forming lightweight doughnuts and separating the formed doughnuts from the supply of dough cleanly for free-falling into a doughnut frying tank having a doughnut moving conveyor therein for moving the doughnuts through a heated cooking oil, comprising the steps of extruding the supply of dough containing gluten or other sticky substances that are exuded when the dough is extruded into a toroidal shape past a cylindrical dough cutting surface located above a doughnut frying tank, distributing a film of the cooking oil on the dough cutting surface, severing the formed toroidal shaped dough into a doughnut by passing a cutting piston past and into engagement with the cutting surface, whereby the doughnut contacts the cooking oil on the dough cutting surface and freely releases from the cutting surface to fall in timed relationship to movement of the conveyor in the frying tank.

As is apparent from the invention, the method and apparatus produce doughnuts which fall freely into the frying tank for reducing damaged products and which can enable increased production rates so that the large, rapid production of doughnuts can fall freely between the flights of the conveyor.

DETAILED DESCRIPTION OF THE INVENTION

Figure 1:
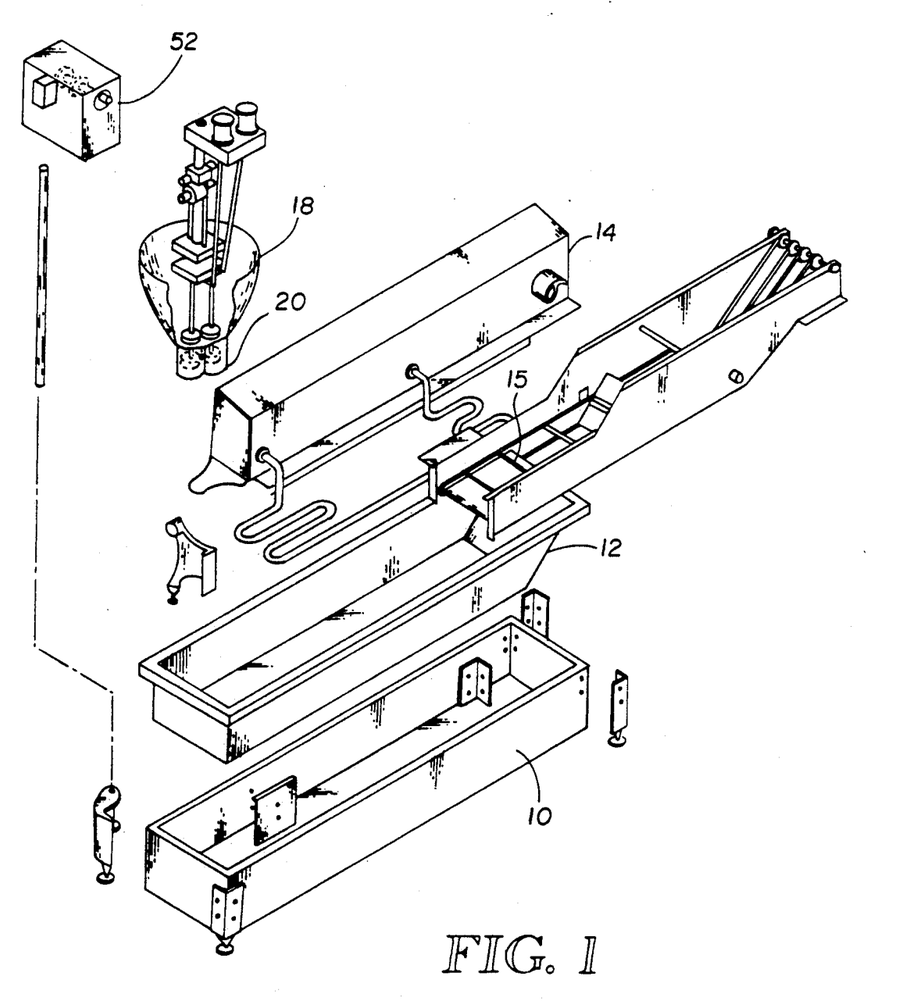
FIG. 1 is an exploded isometric showing a typical doughnut making apparatus.

FIG. 1 shows a typical doughnut making apparatus of the type shown in U.S. Pat. No. 4,346,649. In addition, U.S. Pat. No. 3,945,785 shows details of forming doughnuts in a cylinder-type dough extruder of the type used to make toroidal shaped doughnuts. The details of these patents are incorporated herein by reference thereto.

A typical doughnut forming apparatus will include a base 10 holding a frying tank 12 which holds a level of hot cooking oil heated by a heater 14. Doughnuts are dropped in to the tank and are moved through the tank by the flights 15 of a conveyor. The doughnuts are timed to be formed and to drop between the flights so that they land directly in the cooking oil.

The dough is deposited in a hopper 18 having one or more cylinders 20 terminating in a lower open end having a cutting edge 22. The dough is extruded out of the cylinder by an upper extruding piston 24. The downward stroke of the extruding piston is timed to co-act with a lower cutting piston 26 so that dough is extruded out the bottom of the open end of the cylinder between the extruding and cutting pistons. Thereafter, the cutting piston is retracted so that an upper cutting surface 27 of the cutting piston sweeps past the cutting edge 22 of the cylinder to sever the extruded dough from the dough remaining in the cylinder. This forms the common toroidal shaped doughnut which then falls into the cooking oil between the flights of the conveyor.

The dough used in the making of doughnuts exudes gluten or other sticky substances when compressed in the cylinder. It is an important aspect of this invention to transmit cooking oil from the frying tank to the cylinder wall and cutting surfaces so that the gluten does not attach to the cylinder wall and the cutting surfaces, leaving the surfaces clean and with a light coating of oil for free release of the formed doughnuts.

Figure 4:
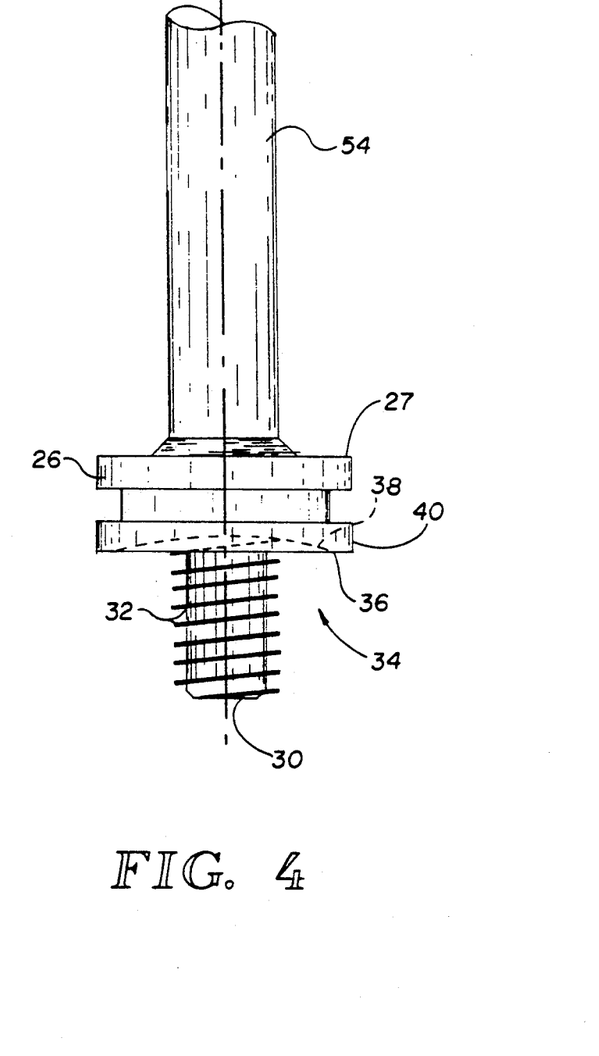
FIG. 4 is an enlarged detail showing a lower piston and threaded dipstick according to a first embodiment of the invention.

In a first embodiment of the invention, a threaded dipstick 30 is connected to a lower side 32 of the lower cutting piston 26, as best shown in FIG. 4. The dipstick 30 includes a plurality of thread flights 34 extending from the lower piston to a lower end of the dipstick. Preferably, the lower side of the lower piston includes a lower side rim 36 positioned circumferentially about a beveled interior surface 38.

The dipstick 30 is dipped into the cooking oil in the frying tank to wet a portion of the thread flights 34. The oil travels up the thread flights by capillary action to the interior surface 38 of the lower piston 26. Capillary action and gravity cause the oil to travel along the interior surface to the lower side rim 36. Capillary action transmits the oil to an outer piston 40 of the piston. When the lower piston reciprocates in and out of the cylinder 20, the oil coats the cutting edge 27 of the cylinder and the cutting edge 22 of the lower piston.

Reciprocation of the upper piston 24 is controlled by elongated control rods 42 that are fixed to a traveling block 44. Upper control rods 46 are connected to the traveling block 44 and to a driven block 48. Drive pins 50 are driven by a conventional yoke mechanism 52 (FIG. 1) that reciprocates that upper piston in a predetermined time sequence.

A piston rod 54 for the lower cutting piston 26 is reciprocating by a second driven block 56 that is fixed to the piston rod. The block 56 is provided with drive pins 58 that are also driven by the eccentric yoke mechanism 52 shown schematically in FIG. 1.

The details of the piston operating mechanisms are well known so that further description is not necessary for an understanding of the invention.

Figure 5:
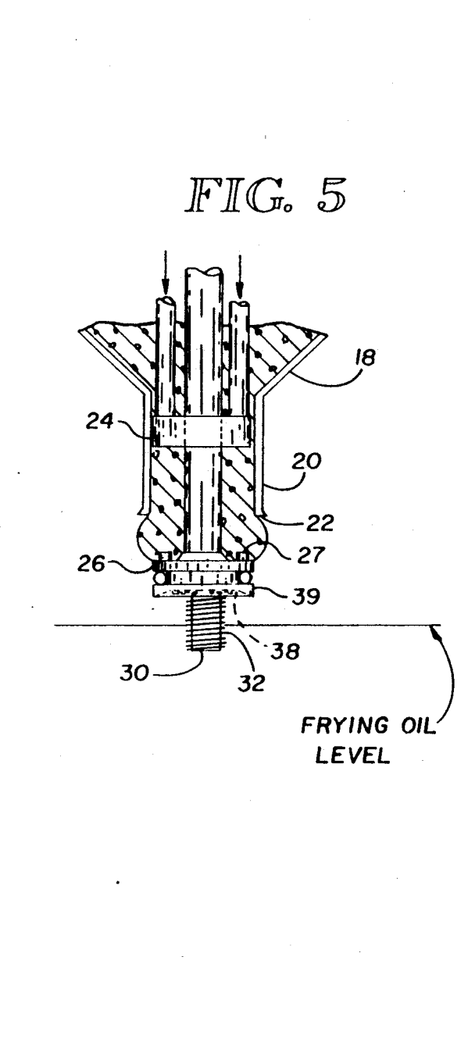
FIG. 5 is a schematic operational view showing the first embodiment of the apparatus beginning to extrude dough.
Figure 6:
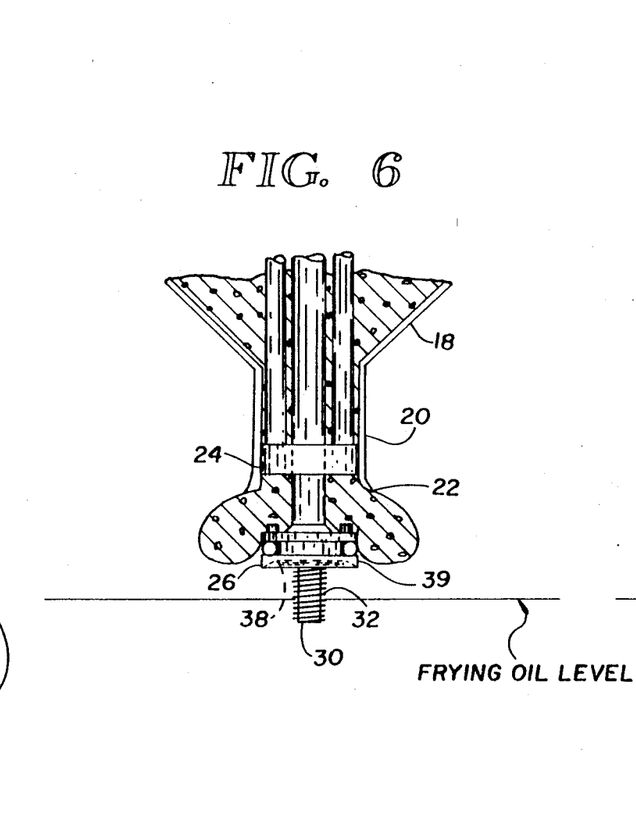
FIG. 6 is an operational schematic showing further extrusion of the dough according to the first embodiment.
Figure 7:
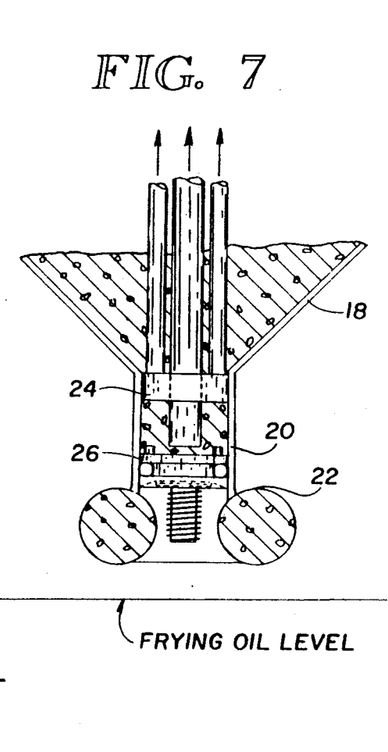
FIG. 7 is an operational schematic showing the toroidal shaped doughnut has been cut from the dough in the cylinder according to the first embodiment.

The method can best be described by proceeding through the operation of the apparatus illustrated. In operation, the upper and lower pistons are shown in the relaxed position in FIGS. 2 and 3 in which dough has filled the void between the pistons. In FIG. 5, the upper piston has begun to move down so that dough is now trapped and being extruded out of the cylinder. In FIG. 6, the dough is now being extruded out between the cylinder cutting edge 22 and the upper cutting surface 27 of the cutting piston 26. In FIG. 7, both pistons are being retracted so that the extruded dough now is cut into its toroidal doughnut shape by the upper surface of the cutting piston engaging the cutting edge 22 of the lower open end of the cylinder.

While the lower piston 26 moves down to allow the dough to be extruded out of the cylinder, the dipstick 30 is dipped into the cooking oil. As discussed above, the oil travels by capillary action up the dipstick thread flights 32 to the piston interior surface 38 and out to the outer surface 39 of the lower piston. As the lower piston reciprocates upwardly, the oil is drawn onto and coats the surfaces of both the inside of the cylinder and the cylinder cutting edge 22. Oil also coats the upper cutting edge 27 of the lower piston. The coating prevents the buildup of gluten and also provides a slippery surface for free release of the doughnut.

Figure 8:
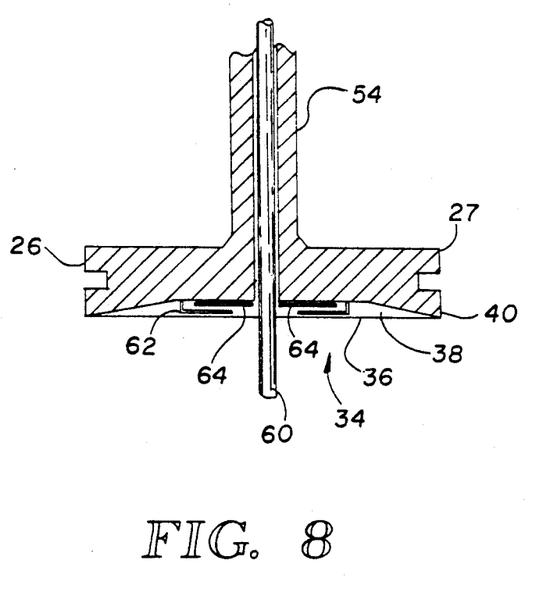
FIG. 8 is an enlarged detail showing a lower piston and dipstick according to a second embodiment of the invention.

In a second embodiment of the invention, an elongated dipstick 60 is positioned within the lower piston 26 and piston rod 54 as shown in FIG. 8. The dipstick 60 is connected to the upper traveling block 44 so as to move reciprocally with the upper piston 24. Connected to the beveled interior surface 38 of the lower piston is a cage 62. Positioned within the cage is a floating wiper washer 64 having an internal diameter slightly larger than the diameter of the dipstick.

The dipstick 60 moves reciprocally within the lower piston 26 and piston rod 54 when the two pistons move reciprocally with respect to each other. The dipstick is dipped into the cooking oil when the upper piston 24 is in its most downward position. The cooking oil adheres to the dipstick and is wiped onto the washer 64 when the dipstick moves upward with respect to the lower piston. The oil moves by capillary action and gravity along the washer and the piston interior surface 38 through the cage 62 to the lower side rim 36. The oil is transmitted to the cylinder cutting surface 22 and piston cutting edge 27 as discussed above with respect to the first embodiment.

Figure 2:
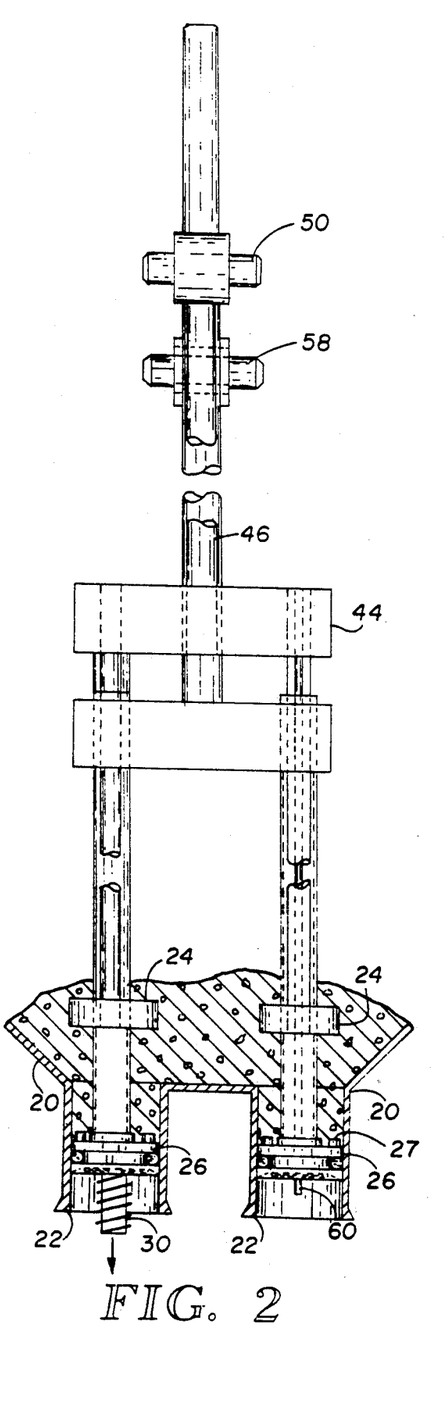
FIG. 2 is a fragmentary side elevation of a portion of a doughnut making apparatus according to the present invention.
Figure 3:
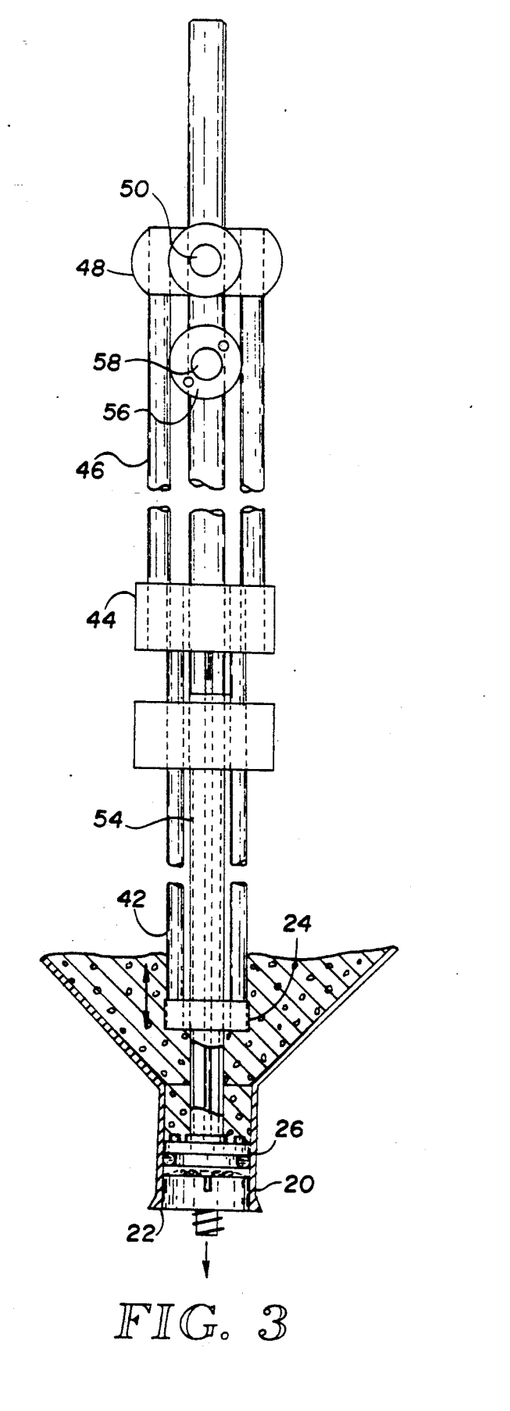
FIG. 3 is a fragmentary front elevation of the doughnut making apparatus shown in FIG. 2.
Figure 9:
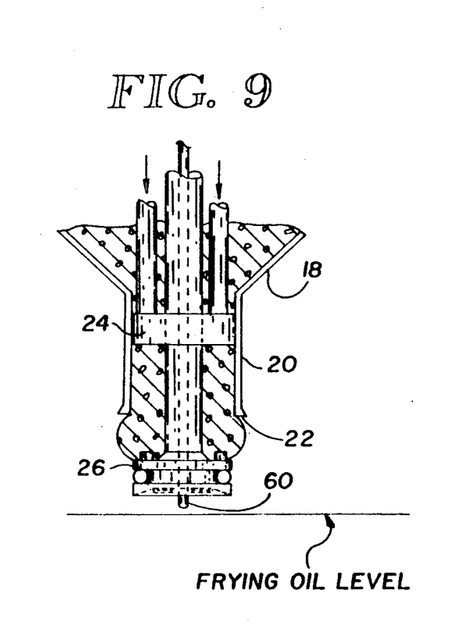
FIG. 9 is a schematic operational view showing the second embodiment of the apparatus beginning to extrude dough.
Figure 10:
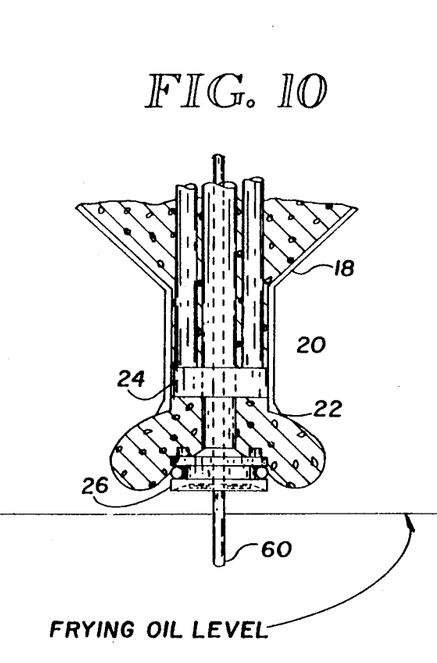
FIG. 10 is an operational schematic showing further extrusion of the dough according to the second embodiment.
Figure 11:
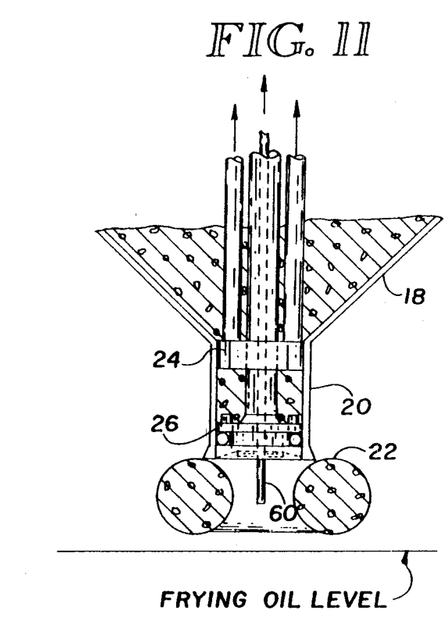
FIG. 11 is an operational schematic showing the toroidal shaped doughnut has been cut from the dough in the cylinder according to the second embodiment.

The second embodiment, shown in FIGS. 8–11, extrudes dough according to the same operation discussed above with respect to FIGS. 4–7. However, the dipstick 60 moves with the upper piston 24 because of their joint connection to the upper traveling block 44. During the initial phase of the extruding operation the pistons move together downward as shown in FIG. 9. The upper piston continues to move down while the lower piston 26 stops, causing the dipstick to move down through the lower piston into the cooking oil, as shown in FIG. 10. After cutting a doughnut, the dipstick moves up into the lower piston to wipe the oil on the washer 64 as shown in FIGS. 2 and 3. As discussed above, the oil is transmitted by gravity and capillary action to the outer surface 40 of the lower piston, from where it is wiped on the cylinder cutting surface 22 and piston cutting edge 27.

While the preferred embodiments of the invention have been illustrated and described, variations will be apparent to one skilled in the art without departing from the principles described herein. Accordingly, the invention is not to be limited to the specific embodiments illustrated in the drawings and described herein.

I claim:

1. An apparatus for forming doughnuts or other edible products using a dough extrusion mechanism for extruding shaped products, the products made from a dough which exudes a gluten or other sticky substance when the dough is compressed, comprising:
   a frying tank for enclosing cooking oil to be used to fry the products;
   at least one cylinder for forming the dough, and having an open lower end with a cutting edge;
   a lower cutting piston in the cylinder;
   an upper extruding piston in the cylinder;
   means for reciprocating the upper piston relative to the cylinder lower end;
   means for reciprocating the lower piston relative to the cylinder lower end and upper piston in conjunction with the upper piston reciprocating means, thereby trapping a quantity of dough, extruding the dough out the lower end of the cylinder, and cutting the extruded dough from the dough remaining in the cylinder between the cylinder lower end and the lower piston by moving the lower piston into engagement with the lower end of the cylinder; and
   means for transmitting cooking oil from the frying tank to the lower piston, the piston distributing a layer of cooking oil around the lower end of the cylinder to inhibit bonding of the dough or gluten or other sticky substances to the lower end of the cylinder so that the dough product falls freely from the cutting edge of the lower end of the cylinder.

2. The apparatus of claim 1, wherein the lower piston is supported on a piston rod and the cooking oil transmitting means includes an elongated dipstick extending longitudinally through the piston rod, the dipstick being coupled to the upper piston reciprocating means, such that the dipstick extends into the cooking oil when in a lowered position to obtain cooking oil, the dipstick being pulled into the lower piston to deposit some or all of the cooking oil obtained onto the lower piston, the cooking oil being conveyed along the lower piston to the cutting edge of the cylinder.

3. The apparatus of claim 2, wherein the cooking oil transmitting means includes a washer positioned at a lower side of the lower piston, the dipstick extending through the washer, the dipstick having a diameter slightly less than an internal diameter of the washer such that the washer wipes the cooking oil off of the dipstick as the dipstick is pulled into the lower piston and transmits the wiped oil to the lower piston.

4. The apparatus of claim 3, wherein the cooking oil transmitting means includes a cage attached to the lower side of the lower piston, the washer being positioned between the cage and the lower side of the lower piston, the cooking oil being conveyed through the cage along the lower side of the lower piston.

5. The apparatus of claim 1, wherein the cooking oil transmitting means includes a dipstick coupled to the lower piston such that the dipstick extends into the cooking oil when in a lowered position to obtain cooking oil, the cooking oil being conveyed up the dipstick to the lower piston which conveys the cooking oil to the cutting edge of the cylinder.

6. The apparatus of claim 5, wherein the dipstick has a threaded exterior such that the cooking oil is conveyed by capillary action up the threaded exterior to the lower piston.

7. An apparatus for forming lightweight doughnuts, comprising:
   a hopper of doughnut forming dough of the type exuding gluten or other sticky substance of the dough;
   a doughnut-forming cylinder coupled to the hopper and having a lower cutting edge;
   a cutting piston in the cylinder, said cutting piston and cylinder being reciprocable relative to one another;
   means for moving dough through the cylinder to the cutting piston;
   a frying tank enclosing a supply of cooking oil,
   a transmission system for carrying the cooking oil from the frying tank to the lower cutting edge of the cylinder for inhibiting the buildup of the gluten or other sticky substance so that the formed doughnut falls freely from the cylinder lower cutting edge as the edge and cutting piston engage one another; and
   means for moving the piston and the cylinder relative to one another to cut the formed doughnut from the dough remaining in the cylinder.

8. The apparatus of claim 7, wherein the transmission system includes a dipstick coupled to the piston such that the dipstick extends into the cooking oil when in a lowered position to obtain cooking oil, the cooking oil being conveyed up the dipstick to the piston which conveys the cooking oil to the cutting edge of the cylinder.

9. The apparatus of claim 8, wherein the dipstick has a threaded exterior such that the cooking oil is conveyed by capillary action up the threaded exterior to the piston.

10. The apparatus of claim 7, wherein the transmission system includes an elongated dipstick extending longitudinally through the piston and a reciprocating means for moving the dipstick into the cooking oil when in a lowered position to obtain cooking oil, the reciprocating means pulling the dipstick into the piston to deposit some or all of the cooking oil obtained onto the piston, the cooking oil being conveyed by the piston to the cutting edge of the cylinder.

11. A method of forming lightweight doughnuts and cleanly separating the formed doughnuts from a supply of dough for free-fall into a doughnut frying tank enclosing cooking oil, comprising:

extruding a supply of dough containing gluten or other sticky substances that are exuded when the dough is extruded in a toroidal shape past a cylindrical dough cutting surface located above the doughnut frying tank;

transmitting cooking oil from the frying tank to the dough cutting surface;

severing the formed toroidal shaped dough into a doughnut by passing a cutting piston and the dough cutting surface relative to one another, whereby the doughnut contacts the cooking oil on the dough cutting surface and freely releases from the cutting surface to fall in the frying tank.

12. The method of claim 11, wherein the transmitting step includes dipping a dipstick into the cooking oil and conveying the cooking oil from the dipstick to the cutting piston and from the cutting piston to the cutting surface.

13. The method of claim 12, wherein the dipstick is coupled to the cutting piston and the cooking oil is conveyed from the dipstick to the cutting piston using capillary action.

14. The method of claim 12, wherein the conveying step includes pulling the dipstick into the cutting piston to wipe the cooking oil onto the cutting piston.

15. The method of claim 12, wherein the step of moving the cutting piston and cutting surface relative to one another includes moving the piston past a stationary cylinder.

* * * * *